(12) United States Patent
Yamamoto et al.

(10) Patent No.: US 10,033,711 B2
(45) Date of Patent: Jul. 24, 2018

(54) DIRECTORY SERVICE DEVICE, CLIENT DEVICE, KEY CLOUD SYSTEM, METHOD THEREOF, AND PROGRAM

(71) Applicant: NIPPON TELEGRAPH AND TELEPHONE CORPORATION, Chiyoda-ku (JP)

(72) Inventors: Tomohide Yamamoto, Tokyo (JP); Go Yamamoto, Tokyo (JP); Tetsutaro Kobayashi, Tokyo (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 201 days.

(21) Appl. No.: 14/896,184

(22) PCT Filed: Jul. 16, 2014

(86) PCT No.: PCT/JP2014/068851
§ 371 (c)(1),
(2) Date: Dec. 4, 2015

(87) PCT Pub. No.: WO2015/008769
PCT Pub. Date: Jan. 22, 2015

(65) Prior Publication Data
US 2016/0127335 A1    May 5, 2016

(30) Foreign Application Priority Data
Jul. 18, 2013  (JP) .................................. 2013-149150

(51) Int. Cl.
*H04L 9/32*    (2006.01)
*H04L 29/06*   (2006.01)
(Continued)

(52) U.S. Cl.
CPC .......... *H04L 63/061* (2013.01); *H04L 9/0822* (2013.01); *H04L 9/0866* (2013.01);
(Continued)

(58) Field of Classification Search
CPC ............. H04L 61/1511; H04L 63/0428; H04L 29/12066; H04L 9/321; H04L 2209/76;
(Continued)

(56) References Cited

U.S. PATENT DOCUMENTS

2006/0143702 A1\* 6/2006 Hisada ................ H04L 12/4641
726/15
2012/0323981 A1 12/2012 Yamamoto et al.
(Continued)

FOREIGN PATENT DOCUMENTS

CN   103221988 A   7/2013
JP   2007-074106 A  3/2007
(Continued)

OTHER PUBLICATIONS

NTT Press Releases, ""Cloud-managed-key Cryptographic Scheme" as a Drastic Solution to Data Protection Issues in an Online Environment", Feb. 2012, http://www.ntt.co.jp/news2012/1202e/120210b.html.\*
(Continued)

*Primary Examiner* — Catherine B Thiaw
*Assistant Examiner* — Quy C Pham
(74) *Attorney, Agent, or Firm* — Oblon, McClelland, Maier & Neustadt, L.L.P.

(57) ABSTRACT

Name information which is generated by using a value corresponding to a decryption key and address information of a key cloud device which provides a cloud-key management type decryption service in which the decryption key is used are stored in a storage of a directory service device in a manner to associate the name information with the address (Continued)

information, and a searching unit of the directory service device searches the storage by using the inputted name information to obtain address information corresponding to the inputted name information.

4 Claims, 5 Drawing Sheets

(51) Int. Cl.
*H04L 9/08* (2006.01)
*H04L 29/08* (2006.01)
(52) U.S. Cl.
CPC ...... *H04L 63/0435* (2013.01); *H04L 63/0853* (2013.01); *H04L 63/0876* (2013.01); *H04L 67/327* (2013.01); *H04L 2209/60* (2013.01)
(58) Field of Classification Search
CPC ....... H04L 9/3236; H04L 9/083; H04L 9/088; H04L 29/12613; H04L 45/745; G06Q 20/0855; G06Q 20/3829; G06F 21/6245
See application file for complete search history.

(56) References Cited

U.S. PATENT DOCUMENTS

| | | |
|---|---|---|
| 2013/0318360 A1 | 11/2013 | Yamamoto et al. |
| 2013/0339413 A1 | 12/2013 | Yamamoto et al. |

FOREIGN PATENT DOCUMENTS

| | | | |
|---|---|---|---|
| JP | 2007074106 A | * | 3/2007 |
| JP | 2012-238935 A | | 12/2012 |
| WO | 2011/086992 A1 | | 7/2011 |
| WO | 2012/057134 A1 | | 5/2012 |
| WO | 2012/121152 A1 | | 9/2012 |
| WO | WO 2013/029569 A1 | | 3/2013 |

OTHER PUBLICATIONS

Kubota et al., "JP2007_074106A_EnglishTranslation" (English translation of cited foreign patent document JP 2007074106 A), Mar. 2007.*
International Search Report dated Oct. 21, 2014, for PCT/JP2014/068851 Filed Jul. 16, 2014.
"Cloud-managed-key cryptographic scheme," Business Communication, Oct. 1, 2012, vol. 49, No. 10, pp. 20-21 (with partial translation).
"'Cloud-managed-key Cryptographic Scheme' as a Drastic Solution to Data Protection Issues in an Online Environmen," NTT Technical Review, May 2012, pp. 46-47 (with partial translation).
Extended European Search Report dated Feb. 21, 2017 in Patent Application No. 14826385.8.
"Output version of Draft Recommendation Y.dsncdf, DSN Content Distribution Functions (Q.19/13 meeting at NGN-GSI meeting, Geneva, Jun. 4-15, 2012)" International Telecommunication Union, Telecommunication Standardization Sector, vol. 19/13, XP044021887, Oct. 2012, pp. 1-59.
J. Schlyter, et al., "Using DNS to Securely Publish Secure Shell (SSH) Key Fingerprints" Network Working Group, RFC 4255, XP015054917, Jan. 2006, 9 pages.
Office Action dated Aug. 9, 2016 in Japanese Patent Application No. 2015-527308 with English translation.
Combined Office Action and Search Report dated May 22, 2017 in Chinese Patent Application No. 201480030328.6 (with unedited computer generated English translation).

* cited by examiner

DIRECTORY SERVICE DEVICE, CLIENT DEVICE, KEY CLOUD SYSTEM, METHOD THEREOF, AND PROGRAM

TECHNICAL FIELD

The present invention relates to a technique for providing a cloud-key management type decryption service.

BACKGROUND ART

Examples of information for uniquely specifying a device such as a server device on a network include name information (logical name) such as a fully qualified domain name (FQDN) and a netbios name and address information, such as an IP address, which is unique to a device. Here, address information such as an IP address is static and it is not easy to make a change of the address information. Therefore, a device name is commonly specified by name information such as a FQDN and a netbios name in communication, the name information is converted into address information such as an IP address by utilizing name resolution such as a domain name system (DNS) and Windows (a registered trade mark) Internet Name Service (WINS), and communication with the device is started by using the address information. In the DNS, for example, when a client requests name resolution for a FQDN from a DNS server which is specified by a LAN and a WAN, the DNS server device tracks a hierarchy from a route server device of the DNS or requests name resolution from a server device of an upper stage, for example, so as to be able to return an IP address corresponding to the FQDN to the client (refer to Patent Literature 1).

Meanwhile, a cloud-key management type encryption for solving a key management issue of a decryption key (for example, a symmetric key in a case of a symmetric key crypto system and a private key in a case of a public key cryptosystem) is proposed and the general description of the system (cloud key system) is disclosed by a literature and the like (refer to Non-Patent Literature 1).

PRIOR ART LITERATURE

Patent Literature

Patent literature 1: Japanese Patent Application Laid Open No. 2012-238935

Non-Patent Literature

Non-patent literature 1: "Cloud-managed-key Cryptographic Scheme" as a Drastic Solution to Data Protection Issues in an Online Environment", NTT Technical Review, May, 2012, pp. 46-47

SUMMARY OF THE INVENTION

Problems to be Solved by the Invention

In a cloud key system which has been conventionally proposed, a physically-single key cloud device provides a decryption service of an encrypted content. Therefore, a client device to receive the decryption service has been able to access the single key cloud device and receive the decryption service if the client device holds only name information of the key cloud device.

On the other hand, it can be assumed to construct a cloud key system in which a plurality of pieces of key cloud devices are logically and physically arranged on the network in a dispersed manner and respective key cloud devices provide decryption services using respective decryption keys. In such case, a client device to receive a decryption service of a certain encrypted content needs to access a key cloud device which provides a decryption service corresponding to the encrypted content among a plurality of pieces of key cloud devices. Even in a case where only a physically-single key cloud device provides a decryption service of an encrypted content, a client device sometimes does not know name information of the key cloud device.

The present invention provides a technique which enables a client device to easily access a key cloud device which provides a decryption service corresponding to an encrypted content in a case where key cloud devices provide decryption services using respective decryption keys.

Means to Solve the Problems

Address information of a key cloud device which provides a cloud-key management type decryption service using a decryption key is obtained by using name information which is generated by using a value corresponding to the decryption key for decrypting an encrypted content.

Effects of the Invention

Accordingly, a client device can easily access a key cloud device which provides a decryption service corresponding to an encrypted content.

DETAILED DESCRIPTION OF THE EMBODIMENTS

Figure 1:
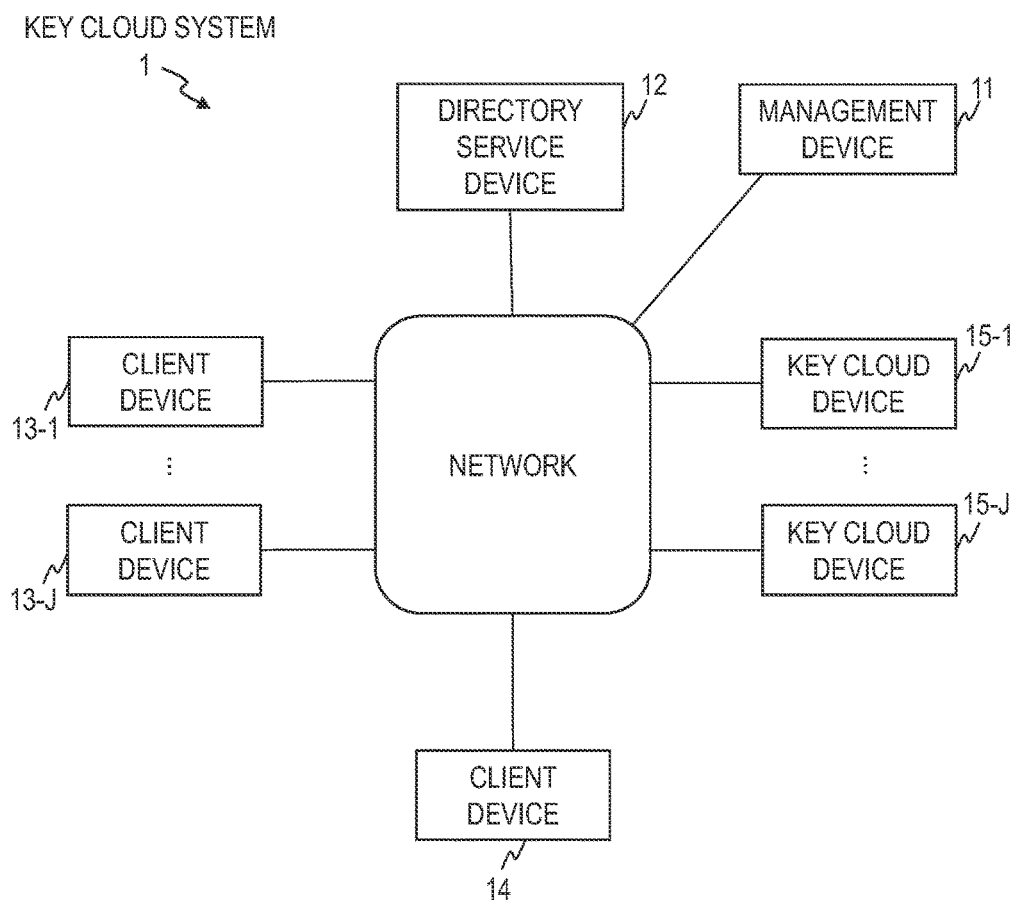
FIG. 1 is a block diagram illustrating the configuration of a key cloud system according to an embodiment.

An embodiment of the present invention is described below with reference to the accompanying drawings.
<Configuration>
As illustrated in FIG. 1, a key cloud system 1 according to the present embodiment includes a management device 11 which manages the system, J pieces of client devices 13-1 to 13-J which perform encryption, a client device 14 which receives a cloud-key management type decryption service, J pieces of key cloud devices 15-1 to 15-J which provide cloud-key management type decryption services, and a directory service device 12 which performs name resolution of the key cloud devices 15-1 to 15-J, and these devices are configured to be able to communicate with each other through the network. Here, J≥1 holds, and for example, J≥2 holds. FIG. 1 illustrates J pieces of client devices 13-1 to 13-J, but J+1 or more pieces of client devices 13 which perform encryption may exist. For example, the number of each client device 13-j (here, j∈{1, ..., J}) may be more than one and these client devices 13-j may constitute a group corresponding to each j. Further, FIG. 1 illustrates a single piece of client device 14, but two or more pieces of client devices which receive decryption services may exist. Furthermore, FIG. 1 illustrates J pieces of key cloud devices 15-1 to 15-J, but J+1 or more pieces of key cloud devices which provide decryption services may exist. Furthermore, FIG. 1 illustrates only a single piece of directory service device 12. However, in a case where address information is constituted in a hierarchical fashion, one or more pieces of upper-stage directory service devices for performing name resolution of respective layers may exist.

Figure 2A:
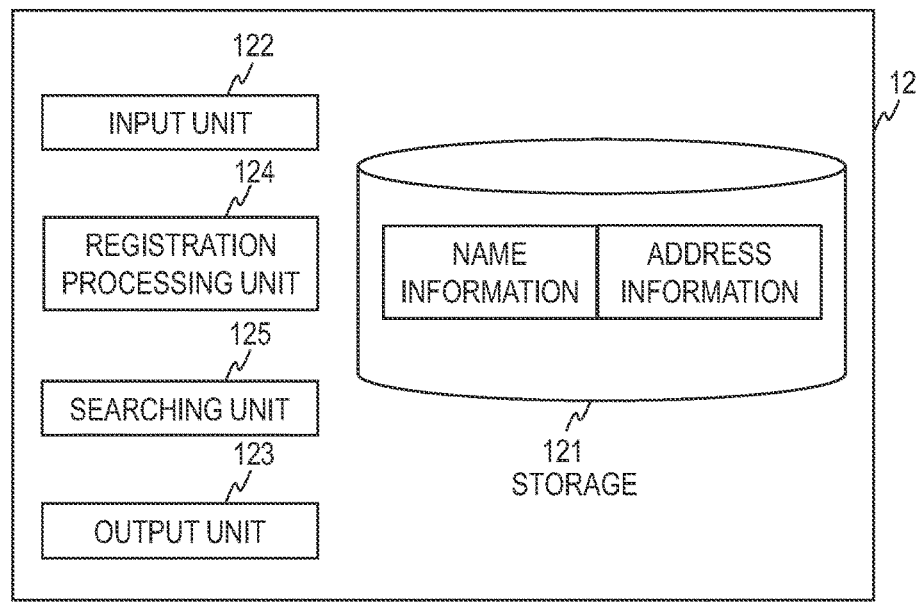
FIG. 2A is a block diagram illustrating the configuration of a directory service device according to the embodiment.
Figure 3A:
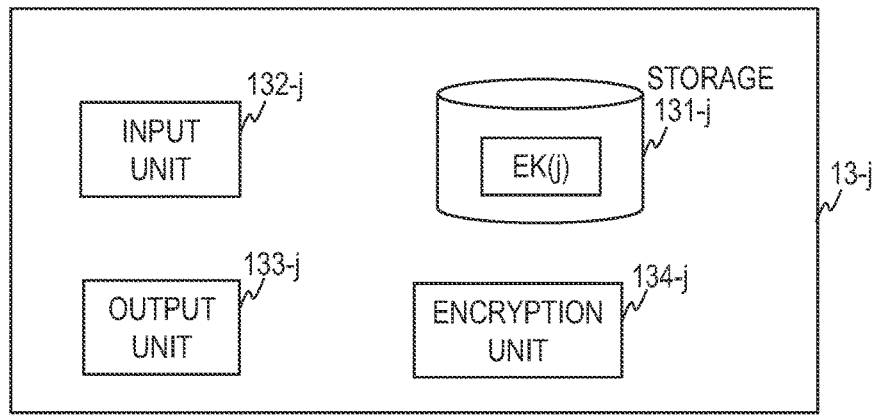
FIG. 3A is a block diagram illustrating the configuration of a client device which performs encryption.
Figure 3B:
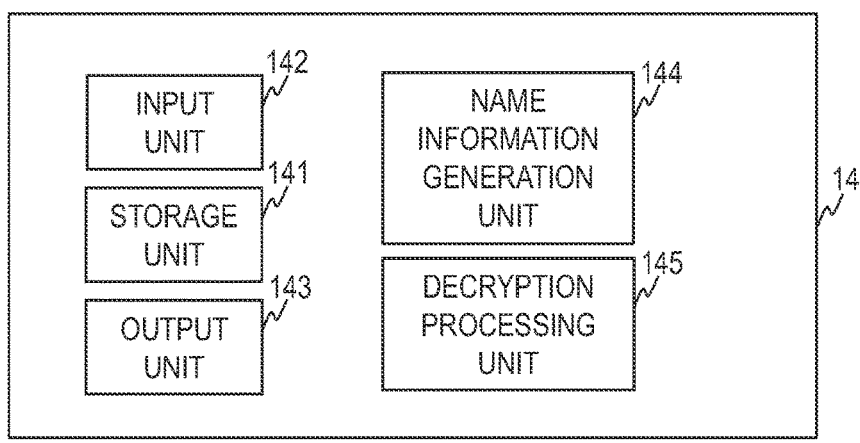
FIG. 3B is a block diagram illustrating the configuration of a client device which receives a decryption service.
Figure 3C:
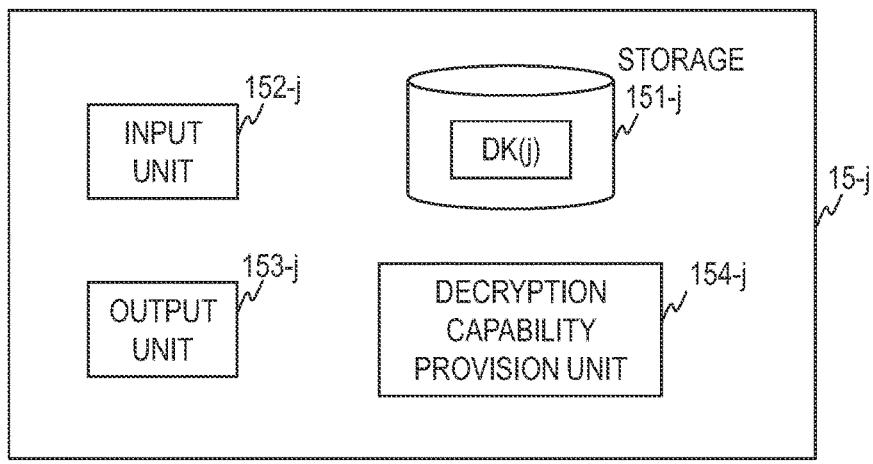
FIG. 3C is a block diagram illustrating the configuration of a key cloud device which provides a decryption service.

As illustrated in FIG. 2A, the directory service device 12 includes a storage 121, an input unit 122, an output unit 123, a registration processing unit 124, and a searching unit 125. As illustrated in FIG. 3A, the client device 13-j (here, j∈{1, ..., J}) includes a storage 131-j, an input unit 132-j, an output unit 133-j, and an encryption unit 134-j. As illustrated in FIG. 3B, the client device 14 includes a storage 141, an input unit 142, an output unit 143, a name information generation unit 144, and a decryption processing unit 145. As illustrated in FIG. 3C, the key cloud device 15-j (here, j∈{1, ..., J}) includes a storage 151-j, an input unit 152-j, an output unit 153-j, and a decryption capability provision unit 154-j.

Each of the management device 11, the directory service device 12, the client devices 13-1 to 13-J, the client device 14, and the key cloud devices 15-1 to 15-J is a device which is constituted when a general-purpose or special-purpose computer which is provided with a processor (hardware processor) such as a central processing unit (CPU), a memory such as a random-access memory (RAM) and a read-only memory (ROM), and the like executes a predetermined program. The computer may include a single piece of processor or a single piece of memory or include a plurality of processors or a plurality of memories. This program may be installed on the computer or may be recorded in a ROM or the like in advance. Further, a part or all processing units may be constituted by using an electronic circuit which independently realizes the processing function instead of an electronic circuit (circuitry), which realizes the functional configuration when a program is read, such as a CPU. Furthermore, an electronic circuit constituting a single piece of device may include a plurality of CPUs. For example, the management device 11 is a server device, specific examples of the directory service device 12 include a DNS server device and a WINS server device, the client devices 13-1 to 13-J and the client device 14 are terminal devices, and the key cloud devices 15-1 to 15-J are server devices.

<Key Setting Processing>

The management device 11 sets an encryption key EK(j) for performing encryption by a predetermined encryption system S(j) (here, j∈{1, ..., J}) to generate an encrypted content C(j), and a decryption key DK(j) for decrypting the encrypted content C(j). Encryption systems S(1), ..., S(J) may be identical to each other or may be different from each other. Encryption keys EK(1), ..., EK(J) are mutually collision-resistant and decryption keys DK(1), ..., DK(J) are mutually collision-resistant. It is preferable that the encryption keys EK(1), ..., EK(J) be different from each other and the decryption keys DK(1), ..., DK(J) be different from each other.

Specific examples of the encryption system S(j) include the public key cryptosystem, the ID based cryptosystem, the functional cryptosystem, the symmetric key cryptosystem, and the like. For example, when the encryption system S(j) is the public key cryptosystem, the encryption key EK(j) is a public key, and the decryption key DK(j) is a private key corresponding to this public key. When the encryption system S(j) is the ID based cryptosystem, the encryption key EK(j) is an identifier such as a mail address and the decryption key DK(j) is a private key corresponding to this identifier. When the encryption system S(j) is the functional cryptosystem, the encryption key EK(j) is a vector which represents an attribute and the like and the decryption key DK(j) is a private key corresponding to this vector. When the encryption system S(j) is the symmetric key cryptosystem, the encryption key EK(j) and the decryption key DK(j) are symmetric keys and EK(j)=DK(j) holds. The decryption key DK(j) is secret information in all encryption systems. On the other hand, the encryption key EK(j) is public information in the public key cryptosystem, the ID based cryptosystem, and the functional cryptosystem, while the encryption key EK(j) is secret information in the symmetric key cryptosystem.

The encryption key EK(j) (here, j∈{1, ..., J}) is stored in the storage 131-j of the client device 13-j (FIG. 3A). The decryption key DK(j) (here, j∈{1, ..., J}) is stored in the storage 151-j of the key cloud device 15-j.

<Registration Processing>

Figure 4:
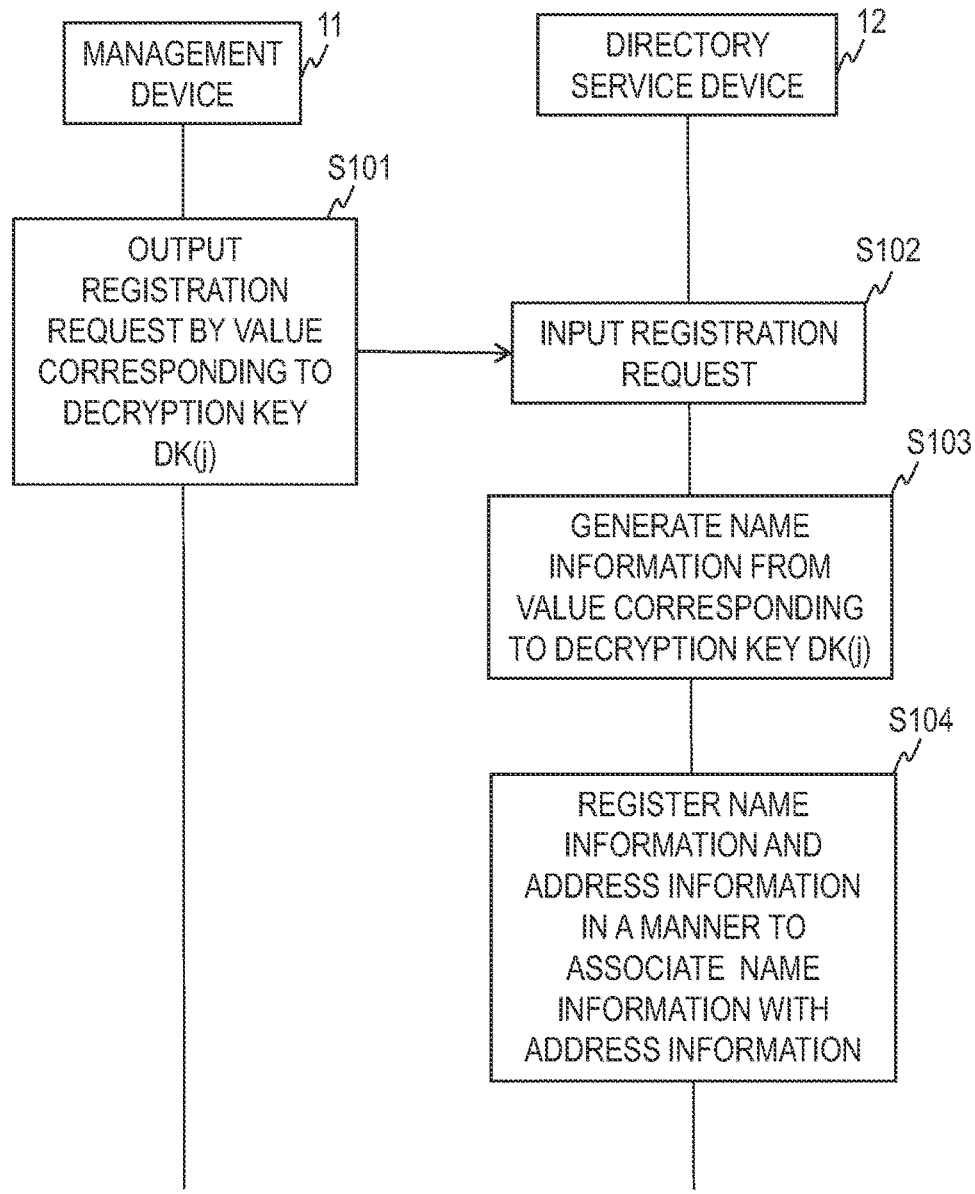
FIG. 4 illustrates registration processing according to the embodiment.
Figure 5:
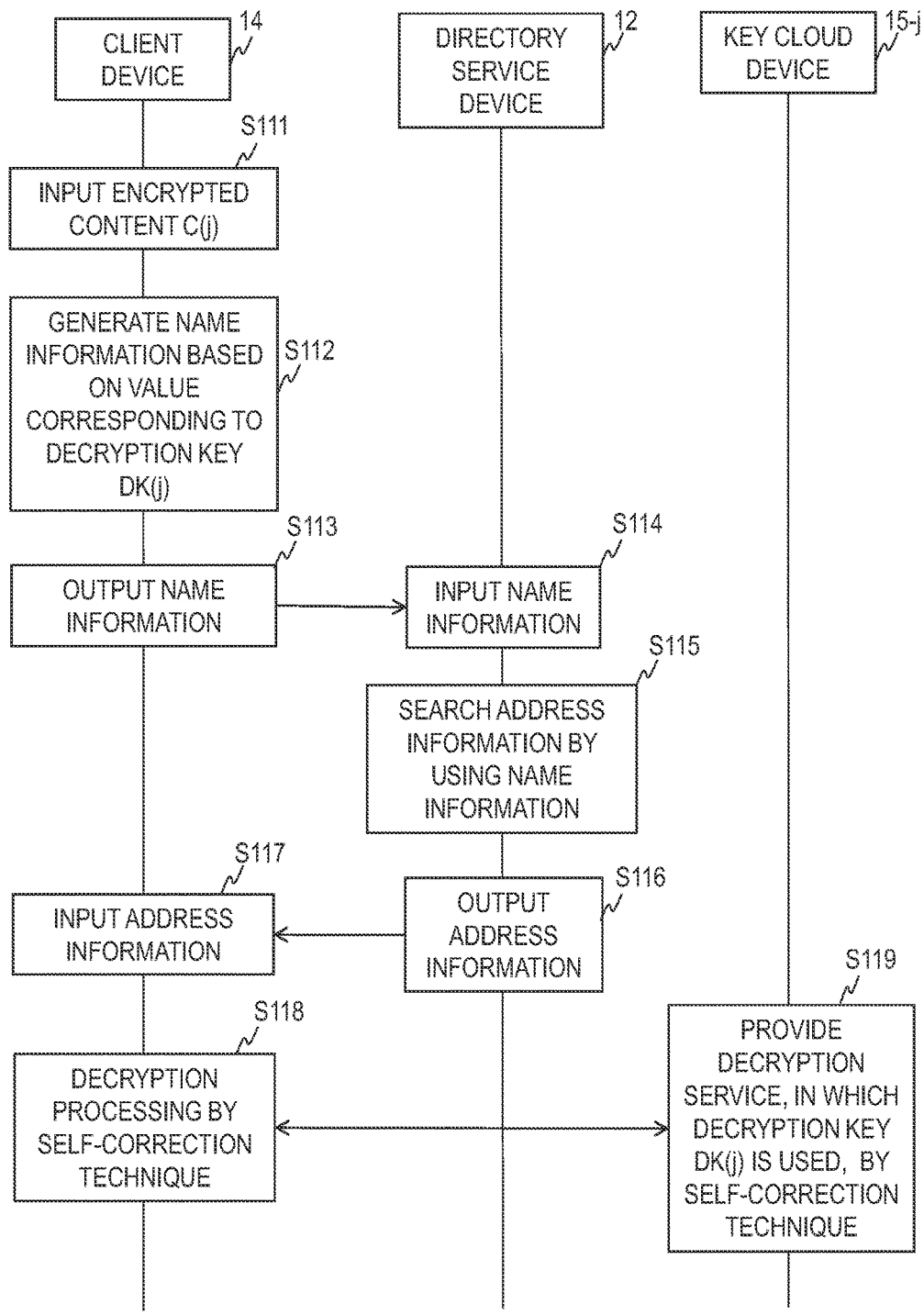
FIG. 5 illustrates key cloud processing according to the embodiment.

As illustrated in FIG. 4, the management device 11 outputs a registration request by a value corresponding to the decryption key DK(j) (here, j∈{1, ..., J}) (step S101). This registration request includes a value corresponding to the decryption key DK(j) and address information A(j) (for example, an IP address) unique to the key cloud device 15-j which provides a cloud-key management type decryption service in which the decryption key DK(j) is used.

A value corresponding to the decryption key DK(1) to a value corresponding to the decryption key DK(J) are mutually collision-resistant to be different values from each other with overwhelming probability. For example, a value corresponding to the decryption key DK(j) is public information and it is difficult to specify the decryption key DK(j) only by the value corresponding to the decryption key DK(j). For example, when the encryption system S(j) is the public key cryptosystem, the ID based cryptosystem, or the functional cryptosystem, a value corresponding to the decryption key DK(j) is the encryption key EK(j) such as a public key, an identifier, and a vector respectively. When the encryption system S(j) is the symmetric key cryptosystem, a value corresponding to the decryption key DK(j) is a key identifier corresponding to the encryption key EK(j) (=DK(j)) which is a symmetric key.

The registration request is transmitted through the network to be inputted into the input unit 122 of the directory service device 12 (FIG. 2A) and transmitted to the registration processing unit 124 (step S102). The registration processing unit 124 generates name information N(j) (second name information) corresponding to the key cloud device 15-j (second key cloud device) by using a value corresponding to the decryption key DK(j) (second decryption key) included in the registration request (step S103). The name information N(j) corresponding to the key cloud device 15-j is obtained from a value corresponding to the decryption key DK(j) and is composed of a character string (for example, a hexadecimal ASCII character string) registerable in the directory service device 12. Further, name information N(1) corresponding to the key cloud device 15-1 to name information N(J) corresponding to the key cloud device 15-J are mutually collision-resistant and are different from each other with overwhelming probability.

Figure 2B:
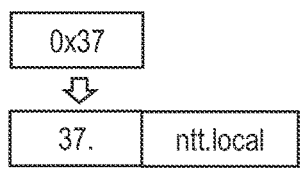
FIGS. 2B to 2E illustrate name information according to the embodiment.

An example of the name information N(j) corresponding to the key cloud device 15-j is a character string including information representing a value corresponding to the decryption key DK(j) or a part of information representing the value corresponding to the decryption key DK(j). In an example of FIG. 2B, an authoritative domain of the directory service device 12 is "ntt.local" and name information N(j) is a hierarchical domain name in which a top level domain is "local", a second level domain is "ntt", and a third level domain is a hexadecimal character string "37" which represents a public key which is the encryption key EK(j). In the case of this example, the registration processing unit 124 generates name information "37.ntt.local" by using the authoritative domain "ntt.local" which is preset and the hexadecimal character string "37" which is inputted and represents a public key.

Figure 2C:
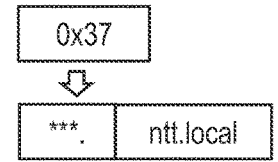
Figure 2D:
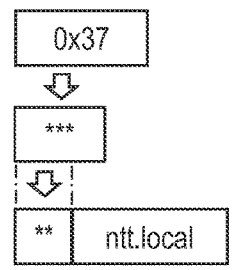

Another example of the name information N(j) is a character string including information which represents a cryptologic hash value of a value corresponding to the decryption key DK(j) or a part of the information which represents the hash value. A cryptologic hash value of a value corresponding to the decryption key DK(j) represents a functional value which is obtained by applying a cryptologic hash function such as SHA-1 to a value corresponding to the decryption key DK(j). A cryptologic hash value has collision resistance. The longer encryption key EK(j) provides higher security in general. On the other hand, the data amount to be registered is larger in a case of longer name information, so that an upper limit of the length of name information is sometimes set. By adopting name information including information which represents a cryptologic hash value of a value corresponding to the decryption key DK(j) or including a part of the information, high security can be secured and the length of name information can be shortened. In an example of FIG. 2C, name information N(j) is a hierarchical domain name in which a top level domain is "local", a second level domain is "ntt", and a third level domain is a character string "***" which represents a cryptologic hash value of a hexadecimal character string "37". In an example of FIG. 2D, name information N(j) is a hierarchical domain name in which a third level domain is "*" which is a part of a character string "*" which represents a cryptologic hash value of a character string "0x37". In cases of these examples, the registration processing unit 124 generates name information "*.ntt.local" or "**.ntt.local" by using the authoritative domain "ntt.local" which is preset, the cryptologic hash value which is preset, and the character string "0x37" which is inputted and represents a public key.

Figure 2E:
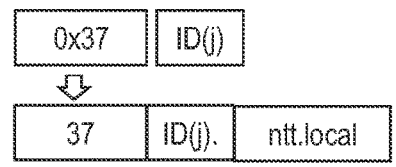

Still another example of the name information N(j) is a character string further including an identifier TD(j) which represents the encryption system S(j) corresponding to the decryption key DK(j). That is, the name information N(j) may further include the identifier ID(j) in addition to information representing a value corresponding to the decryption key DK(j) or a part of the information representing the value corresponding to the decryption key DK(j), and/or information representing a cryptologic hash value of a value corresponding to the decryption key DK(j) or a part of the information representing the hash value. In an example of FIG. 2E, name information N(j) is a hierarchical domain name in which a top level domain is "local", a second level domain is "ntt", and a third level domain is a connection value of a hexadecimal character string "37" which represents a public key, which is the encryption key EK(j), and the identifier ID(j). In a case of this example, the registration processing unit 124 generates name information "37|ID(j).nttlocal" by using the authoritative domain "ntt.local" which is preset, the hexadecimal character string "37" which is inputted and represents a public key, and the identifier ID(j) corresponding to this public key. Here, "α|β" represents concatenation of character strings α and β.

The registration processing unit 124 stores the generated name information N(j) (second name information) and the address information A(j) (second address information), which is included in a registration request and is unique to the key cloud device 15-j (second key cloud device), in the storage 21 in a manner to associate the name information N(j) with the address information A(j), for each j∈{1, ..., J} (step S104). For example, the registration processing unit 124 stores "37.ntt.local" which is the name information N(j) and exemplified in FIG. 2B and an IP address "192.168.1.54" which is the address information A(j) in the storage 21 in a manner to associate "37.ntt.local" with "192.168.1.54".

<Processing for Decryption Service Provision>

A plain text content is inputted into the input unit 132-j of any client device 13-j (FIG. 3A) which performs encryption and the content is transmitted to the encryption unit 134-j. The encryption unit 134-j encrypts the content in accordance with the encryption system S(j) by using the encryption key EK(j) which is read from the storage 131-j, so as to generate and output an encrypted content C(j). In the encrypted content C(j), the above-described "value corresponding to the decryption key DK(j)" is embedded. For example, when the encryption system S(j) is the public key cryptosystem, the ID based cryptosystem, or the functional cryptosystem, the encryption key EK(j) is embedded as the "value corresponding to the decryption key DK(j)" in the encrypted content C(j). For example, when the encryption system S(j) is the symmetric key cryptosystem, a key identifier corresponding to the encryption key EK(j)=DK(j) is embedded as the "value corresponding to the decryption key DK(j)" in the encrypted content C(j). The encrypted content CO) is transmitted to the output unit 133-j to be outputted from the output unit 133-j.

The encrypted content C(j) is transmitted through the network to be inputted into the input unit 142 of the client device 14 (FIG. 3B) (step S111).

The encryption key EK(j) which is embedded as the "value corresponding to the decryption key DK(j)" in the encrypted content C(j) or the key identifier corresponding to the encryption key EK(j) is transmitted to the name information generation unit 144. The name information generation unit 144 generates name information N(j) of the key cloud device 15-j which provides a cloud-key management type decryption service in which the decryption key DK(j) is used, by using the encryption key EK(j) or the key identifier corresponding to the encryption key EK(j) (the value corresponding to the decryption key DK(j)) so as to output the name information N(j) (step S112). A generation method of the name information N(j) in step S112 is same as the generation method of the name information N(j) in step S103 in the registration processing. The name information N(j) which is generated is transmitted to the output unit 143 and the output unit 143 outputs a name resolution request including the name information NU) to the directory service device 12 (step S113). Here, in a case where the output unit 143 knows address information of the directory service device 12, the output unit 143 transmits the name information to the directory service device 12 by using the address information. In a case where upper-stage directory service devices exist as a DNS server device, the output unit 143 may track a hierarchy from a directory service device of the route and request name resolution from an upper-stage directory service device, for example, so as to acquire address information of the directory service device 12.

The name resolution request is transmitted through the network to be inputted into the input unit 122 of the directory service device 12 and the name information N(j) included in the name resolution request is transmitted to the searching unit 125 (step S114). The searching unit 125 searches the storage 121 by using the inputted name information N(j) so as to obtain address information A(j) corresponding to the inputted name information N(j) (obtain second address information corresponding to the inputted name information N(j) as address information A(j)) and output the address information A(j) (step S115). For example, the searching unit 125 specifies name information, which is in the storage 121 and is accorded with the inputted name information N(j) so as to obtain and output the address information A(j) associated with the specified name information. For example, when name information "37.ntt.local" is associated with address information "192.168.1.54" in the storage 121 and the name information "37.ntt.local" is inputted into the searching unit 125, the searching unit 125 obtains and outputs the address information "192.168.1.54". The obtained address information A(j) is address information of the key cloud device 15-$j$ which provides the cloud-key management type decryption service in which the decryption key DK(j) is used. The address information A(j) is transmitted to the output unit 123 to be outputted (step S116).

The address information A(j) is transmitted through the network, inputted into the input unit 142 of the client device 14, and transmitted to the decryption processing unit 145 (step S117). The decryption processing unit 145 connects to the key cloud device 15-$j$ from the output unit 143 through the network by using the address information A(j). In response to this, the decryption capability provision unit 154-$j$ of the key cloud device 15-$j$ (FIG. 3C) provides a decryption service from the output unit 153-$j$ to the decryption processing unit 145 through the network, and the decryption processing unit 145 obtains a decryption result of the encrypted content C(j) due to the reception of the decryption service and outputs the decryption result of the encrypted content C(j) (step S118, step S119).

A decryption service is provided by using the self-correction technique of related art, for example (refer to International Publication Nos. WO/2012/057134, WO/2011/086992, and WO/2012/121152, for example). The self-correction technique is a technique for performing correct calculation at all time by using a calculator or a system which does not always output a correct calculation result (when a calculator which outputs a correct calculation result is used, a correct calculation result is outputted, and when a calculator which does not always output a correct result is used, a correct calculation result is obtained or a result representing that the calculation is impossible is obtained). The decryption service using the self-correction technique includes processing in which the key cloud device 15-$j$ provides the client device 14 with information for obtaining a decryption value of the encrypted content C(j) (a cipher text of a decryption object) in the client device 14 without providing a client device 14 of the outside with information of the decryption key DK(j). Preferably, the key cloud device 15-$j$ provides the client device 14 with information for obtaining a decryption value of the encrypted content C(j) without obtaining information of the encrypted content C(j) from the client device 14 (for example, by obtaining information which is obtained by perturbing the encrypted content C(j)).

Processing for providing a decryption service by using the self-correction technique is exemplified below. In the following example, G and H denote groups, f(x) denotes a decryption function for obtaining an element of the group G by decrypting a cipher text x which is an element of the group H by a specific decryption key DK(j), $X_1$ and $X_2$ denote random variables values of which are in the group G, $x_1$ denotes an realization of the random variable $X_1$, $x_2$ denotes an realization of the random variable $X_2$, and a and b denote natural numbers which are coprime. However, the following example does not limit the present invention and other self-correction techniques may be adopted.

Step 118$a$: The decryption processing unit 145 outputs first input information $\tau_1$ and second input information $\tau_2$ which correspond to the encrypted content C(j) and are elements of the group H. For example, f(x) is a homomorphic function, the group H is a cyclic group, a generator of the cyclic group H is denoted as $\mu_h$, r1 and r2 denote random natural numbers which are 0 or larger, $\tau_1=\mu_h^{r1}x^b$, and $\tau_2=\mu_h^{r2}x^a$. Further, one of a and b may be a constant such as 1. The first input information $\tau_1$ and the second input information $\tau_2$ are transmitted to the key cloud device 15-$j$.

Step 119$a$: The decryption capability provision unit 154-$j$ correctly calculates $f(\tau_1)$ with a probability larger than a certain probability by using the transmitted first input information $\tau_1$ so as to set the obtained calculation result as first output information $z_1$. That is, there are a case of $z_1=f(\tau_1)$ and a case of $z_1 \neq f(\tau_1)$. In other words, the decryption capability provision unit 154-$j$ is capable of calculating $f(\tau_1)$, but the decryption capability provision unit 154-$j$ may output a calculation result including an intended or unintended error. "A certain probability" is a probability which is smaller than 100% and equal to or larger than 0%. An example of "a certain probability" is an unignorable probability. An example of "an unignorable probability" is a probability which is equal to or larger than $1/\psi(k)$ where a polynomial which is a monotonically non-decreasing function about a security parameter k is set to a polynomial $\psi(k)$. The first output information $z_1$ is transmitted to the client device 14.

Step 119$b$: The decryption capability provision unit 154-$j$ correctly calculates $f(\tau_2)$ with a probability larger than a certain probability by using the transmitted second input information $\tau_2$ so as to set the obtained calculation result as second output information $z_2$. That is, there are a case of $z_2=f(\tau_2)$ and a case of $z_2 \neq f(\tau_2)$. In other words, the decryption capability provision unit 154-$j$ is capable of calculating $f(\tau_2)$, but the decryption capability provision unit 154-$j$ may output a calculation result including an intended or unintended error. The second output information $z_2$ is transmitted to the client device 14.

Step 118$b$: The decryption processing unit 145 generates a calculation result $u=f(x)^b x_1$ from the first output information $z_1$ which is transmitted. For example, $v=f(\mu_h)$ holds and $u=z_1 v^{-r1}$ holds. The calculation result u which is generated is stored in a storage (not illustrated in the drawing) of the decryption processing unit 145.

Step 118$c$: The decryption processing unit 145 generates a calculation result $v=f(x)^a x_2$ from the second output information $z_2$ which is transmitted. For example, $v=z_2 v^{-r2}$ holds.

The calculation result v which is generated is stored in the storage (not illustrated in the drawing) of the decryption processing unit 145.

Step 118*d*: The decryption processing unit 145 determines whether any pair of u and v which is stored in the storage satisfies $u^a=v^b$ or not. When any pair of u and v satisfies $u^a=v^b$, the decryption processing unit 145 outputs a pair of u and v which satisfies $u^a=v^b$ and $u^{b'}v^{a'}$ on integers a' and b' which satisfy a'a+b'b=1 as decryption values. When the calculation results u and v do not satisfy $u^a=v^b$ even though the processing of steps 118*a* to 118*d*, 119*a*, and 119*b* are repeated predetermined times, the decryption processing unit 145 outputs error information which represents that decryption is impossible. Here, in a case where one or more pieces of v are stored in the storage (not illustrated in the drawing) of the decryption processing unit 145, the processing of step 118*d* may be performed even between step 118*b* and step 118*c*.

When a decryption service using the self-correction technique is provided, the decryption processing unit 145 obtains a correct decryption value or a result representing that decryption is impossible. A probability in which the decryption processing unit 145 obtains an incorrect decryption value is small to the ignorable extent. Accordingly, in a case where a decryption service using the self-correction technique is provided, the client device 14 is not misrepresented such that an incorrect decryption value is a correct decryption value even without confirming validity of a "value corresponding to the decryption key DK(j)" such as a public key and validity of the key cloud device 15-*j*. Consequently, it is not necessary to verify a public key certificate or to perform authentication processing.

<Modification and the Like>

The present invention is not limited to the above-described embodiment. For example, the example in which a decryption service is provided by using the self-correction technique is provided in the above-described embodiment. However, a decryption service may be provided without using the self-correction technique. For example, a client device which receives a decryption service may connect to the key cloud device 15-*j* through the network by using the address information A(j) and transmit the encrypted content C(j) to the key cloud device 15-*j*. Then, the key cloud device 15-*j* may decrypt the encrypted content C(j) by using the decryption key DK(j) and transmit a decryption value which is obtained through the encryption to the client device.

Further, a combination composed of a part of the management device 11, the directory service device 12, the client devices 13-1 to 13-J, the client device 14, and the key cloud devices 15-1 to 15-J may be implemented on a single computer. That is, the combination composed of a part of these devices may be a single device.

Name information is not limited to a domain name such as a FQDN or a netbios name described above. For example, an identifier such as a user ID and a device ID may be name information. Address information is not limited to an IP address described above. For example, a mail address, a MAC address, and the like may be address information.

Further, the self-correction technique is not limited to the one previously described. For example, the group H may be a direct product group G×G of the group G, the group G may be a cyclic group, a generator of the cyclic group G may be $\mu_g$, cipher text $x=(c_1,c_2)$, (V,W) may be an element of the group H, f(V,W)=Y, r4 to r7 may be random numbers of natural numbers which are 0 or larger, $\tau_1=(c_2^b W^{r4}, c_1^b V^{r4} \mu_g^{r5})$, $\tau_1=(c_2^a W^{r6}, c_1^a V^{r6} \mu_g^{r7})$, $u=z_1 Y^{-r4} \mu_g^{-r5}$, and $v=z_2 Y^{-r6} \mu_g^{-r7}$.

Further, the above-described various types of processing may be executed not only in time-series manner in accordance with the description but also in a parallel manner or an independent manner, depending on a processing capability of a device which executes the processing or as necessary. Furthermore, it is indisputable that alterations can be arbitrarily made without departing from the intent of the present invention.

In a case where the above-described configuration is realized by a computer, processing contents of functions which should be obtained by respective devices are described by a program. By executing this program by a computer, the above-described processing functions are realized on the computer. The program in which the processing contents are described can be recorded in a recording medium which is readable by a computer. An example of the recording medium which is readable by a computer is a non-transitory recording medium. Examples of such recording medium include a magnetic recording device, an optical disk, a magnetooptical recording medium, a semiconductor memory, and the like.

This program is distributed by selling, transferring, or lending a portable recording medium such as a DVD and a CD-ROM in which the program is recorded, for example. Further, this program may be distributed such that this program is stored in a storage device of a server computer and is transferred from the server computer to other computers through the network.

A computer which executes such program once stores the program which is recorded in a portable recording medium or the program transferred from the server computer in a storage device thereof, for example. In execution of processing, the computer reads the program which is stored in the storage device thereof and executes processing in accordance with the program which is read. As another executing configuration of this program, a computer may directly read the program from a portable recording medium so as to execute processing in accordance with the program, and further, the computer may sequentially execute processing in accordance with a received program whenever a program is transferred from the server computer to this computer.

The processing functions of the present device are realized by executing a predetermined program on a computer in the above-described embodiment, but at least a part of these processing functions may be realized on hardware.

ADDITIONAL STATEMENT

[Item 1]

A directory service device which receives an input of name information which is generated by using a value corresponding to a decryption key and obtains address information of a key cloud device, which provides a cloud-key management type decryption service in which the decryption key is used.

[Item 2]

The directory service device according to Item 1, including:

a storage which stores second name information, which is generated by using a value corresponding to a second decryption key, and second address information of a second key cloud device, which provides a cloud-key management type decryption service in which the second decryption key is used, in a manner to associate the second name information with the second address information; and a searching unit which searches the storage by using the name information which is inputted to obtain the second address information corresponding to the name information, as the address information.

[Item 3]

The directory service device according to Item 1 or 2, in which the decryption service includes processing in which the key cloud device provides, without providing an outside client device with information of the decryption key, the client device with information for obtaining a decryption value of a cipher text in the client device by using a self-correction technique.

[Item 4]

The directory service device according to any one of Items 1 to 3, including:

a registration processing unit which generates the second name information by using a value corresponding to the second decryption key and stores the second name information which is generated and the second address information of the second key cloud device, which provides a cloud-key management type decryption service in which the second decryption key is used, in the storage in a manner to associate the second name information with the second address information.

[Item 5]

The directory service device according to any one of Items 1 to 4, in which the name information includes information representing a value corresponding to the decryption key or a part of information representing a value corresponding to the decryption key.

[Item 6]

The directory service device according to any one of Items 1 to 5, in which the name information includes information representing a cryptologic hash value of a value corresponding to the decryption key or a part of information representing the hash value.

[Item 7]

The directory service device according to any one of Items 1 to 6, in which the name information includes an identifier representing an encryption system corresponding to the decryption key.

[Item 8]

The directory service device according to any one of Items 1 to 7, in which the decryption key is secret information which is stored in the key cloud device and a value corresponding to the decryption key is public information.

[Item 9]

The directory service device according to any one of Items 1 to 8, in which the decryption key is a private key and a value corresponding to the decryption key is a public key.

DESCRIPTION OF REFERENCE NUMERALS

1: key cloud system
12: directory service device
13-1 to 13-J, 14: client device
15-1 to 15-J: key cloud device

What is claimed is:

1. A key cloud system comprising:
a client device;
a directory service device having a storage; and
a plurality of key cloud devices; wherein
encryption keys EK(j) correspond to decryption keys DK(j), each of the encryption keys EK(j) is public information, each of the decryption keys DK(j) is secret information, j∈{1, ..., J}, and J≥2;
each of the plurality of key cloud devices stores each of the decryption keys DK(j), and provides a cloud-key management type decryption service in which each of the decryption keys DK(j) is used; and
the directory service device generates name information N(j) corresponding to each of the plurality of key cloud devices by using each of the encryption keys EK(j), and stores the name information N(j) and address information A(j) of each of the plurality of key cloud devices in the storage in a manner to associate the name information N(j) with the address information A(j); wherein
an encrypted content C(i) encrypted with an encryption key EK(i) is input into the client device where i∈{1, ..., J} and the encryption key EK(i) is embedded in the encrypted content C(i);
the client device generates name information N(i) by using the encryption key EK(i) which is embedded in the encrypted content C(i), and outputs the name information N(i) to the directory service device;
the directory service device searches the storage by using the name information N(i) to obtain address information A(i) of a key cloud device, the address information A(i) corresponding to the name information N(i), and outputs the address information A(i);
the client device connects to the key cloud device by using the address information A(i) which is input, and outputs perturbed information which is obtained by perturbing the encrypted content C(i) to the key cloud device in order to receive the cloud-key management type decryption service by the key cloud device; and
the key cloud device obtains the perturbed information and uses a decryption key DK(i) which is stored in the key cloud device to provide the client device with information for obtaining a decryption value of the encrypted content C(i) in the client device by a self-correction technique.

2. The key cloud system according to claim 1, wherein
the name information N(i) includes an identifier ID(i) which represents an encryption system S(i) corresponding to the decryption key DK(i); and
the key cloud device provides the client device with the information for obtaining the decryption value of the encrypted content C(i) in accordance with the encryption system S(i).

3. A decryption method of a key cloud system comprising a client device, a directory service device having a storage, and a plurality of key cloud devices, wherein
encryption keys EK(j) correspond to decryption keys DK(j), each of the encryption keys EK(j) is public information, each of the decryption keys DK(j) is secret information, j∈{1, ..., J}, and J≥2; and
each of the plurality of key cloud devices stores each of the decryption keys DK(j), and provides a cloud-key management type decryption service in which each of the decryption keys DK(j) is used;
the decryption method comprising:
a step of generating name information N(j) corresponding to each of the plurality of key cloud devices by using each of the encryption keys EK(j) at the directory service device; and
a step of storing the name information N(j) and address information A(j) of each of the plurality of key cloud devices in the storage in a manner to associate the name information N(j) with the address information A(j);

the decryption method further comprising:

a step of inputting an encrypted content C(i) encrypted with an encryption key EK(i) into the client device where $i \in \{1, \ldots, J\}$ and the encryption key EK(i) is embedded in the encrypted content C(i);

a step of generating name information N(i) by using the encryption key EK(i) which is embedded in the encrypted content C(i) at the client device;

a step of outputting the name information N(i) to the directory service device from the client device;

a step of searching the storage by using the name information N(i) to obtain address information A(i) of a key cloud device at the directory service device, the address information A(i) corresponding to the name information N(i);

a step of outputting the address information A(i) from the directory service device;

a step of connecting to the key cloud device by using the address information A(i) which is input at the client device;

a step of outputting perturbed information which is obtained by perturbing the encrypted content C(i) to the key cloud device from the client device in order to receive the cloud-key management type decryption service by the key cloud device; and a step of obtaining the perturbed information and using a decryption key DK(i) which is stored in the key cloud device to provide the client device with information for obtaining a decryption value of the encrypted content C(i) in the client device by a self-correction technique at the key cloud device.

4. The decryption method according to claim 3, wherein the name information N(i) includes an identifier ID(i) which represents an encryption system S(i) corresponding to the decryption key DK(i); and the key cloud device provides the client device with the information for obtaining the decryption value of the encrypted content C(i) in accordance with the encryption system S(i).

* * * * *